US008346983B2

(12) United States Patent
Lim et al.

(10) Patent No.: US 8,346,983 B2
(45) Date of Patent: Jan. 1, 2013

(54) SIMULTANEOUS SHARING OF SYSTEM RESOURCES BY MULTIPLE INPUT DEVICES

(75) Inventors: Kok Liang Lim, Caburg North (AU); Kee Keong Lew, Singapore (SG)

(73) Assignee: Creative Technology Ltd, Singapore (SG)

(*) Notice: Subject to any disclaimer, the term of this patent is extended or adjusted under 35 U.S.C. 154(b) by 1026 days.

(21) Appl. No.: 12/158,296

(22) PCT Filed: Dec. 15, 2006

(86) PCT No.: PCT/SG2006/000393
§ 371 (c)(1),
(2), (4) Date: Jun. 19, 2008

(87) PCT Pub. No.: WO2007/073353
PCT Pub. Date: Jun. 28, 2007

(65) Prior Publication Data
US 2008/0307442 A1    Dec. 11, 2008

Related U.S. Application Data

(60) Provisional application No. 60/752,356, filed on Dec. 20, 2005.

(51) Int. Cl.
*G06F 3/00* (2006.01)
*G06F 9/44* (2006.01)
(52) U.S. Cl. .......................... 710/8; 719/321
(58) Field of Classification Search ....... 710/8; 719/321
See application file for complete search history.

(56) References Cited

U.S. PATENT DOCUMENTS

| 5,142,961 | A | 9/1992 | Paroutaud |
| 5,890,017 | A | 3/1999 | Tulkoff et al. |
| 5,917,472 | A * | 6/1999 | Perala ............................ 345/157 |
| 6,128,681 | A | 10/2000 | Shephard |
| 6,598,074 | B1 | 7/2003 | Moller et al. |
| 6,990,456 | B2 | 1/2006 | Fay et al. |
| 2002/0054127 | A1* | 5/2002 | Omori et al. ................... 345/781 |
| 2003/0074371 | A1* | 4/2003 | Park et al. ................... 707/103 R |
| 2003/0076966 | A1* | 4/2003 | Okabayashi ................... 381/119 |
| 2004/0231501 | A1* | 11/2004 | Sim et al. ......................... 84/719 |
| 2004/0231502 | A1* | 11/2004 | Collins, Sr. ..................... 84/723 |
| 2004/0240686 | A1* | 12/2004 | Gibson .......................... 381/119 |

OTHER PUBLICATIONS

Pawer et al., Multiple Mice for Computers in Education in Developing Countries, May 26, 2006, IEEE.*
Simpson, Windows XP Bible, 2001, Hungry Minds.*
SLLA154, VIDs, PIDs, and Firmware: Design Decisions when Using TI USB Device Controllers, Nov. 2003, TI.*

* cited by examiner

*Primary Examiner* — Hyun Nam
(74) *Attorney, Agent, or Firm* — Creative Technology Ltd

(57) ABSTRACT

There is disclosed a method, system and apparatus for enabling the sharing of computer system resources by multiple input devices. The multiple input devices utilize a device driver for all of the multiple input devices, with the method comprising: the device driver allocating a device identifier to each of the multiple input devices; the device driver receiving data from each of the multiple input devices by reference to the device identifier; and the device driver passing the received data to an application for processing.

22 Claims, 4 Drawing Sheets

SIMULTANEOUS SHARING OF SYSTEM RESOURCES BY MULTIPLE INPUT DEVICES

FIELD OF THE INVENTION

This invention relates to a method, system and apparatus for simultaneously sharing system resources by multiple input devices and refers particularly, though not exclusively, to such a method, system and apparatus where the input devices use the same device driver.

BACKGROUND OF THE INVENTION

The home and, in some cases, office or commercial computer has become an active centre for entertainment. Often they are used to output audio produced by digital musical instruments such as, for example, guitars, MIDI-compliant keyboards, and so forth. However, if more than one musical instrument is to be connected, and the same interfacing software is to be used, difficulties arise as a plurality of instruments cannot use the same device driver at the same time.

Resources from the computer may be limited, and latency, the delay of audio output after input into the digital musical instruments, may result if more than one instrument is connected to the computer and used simultaneously. This is undesirable as it would be impossible to teach music to multiple users, play music as a band/group, or jam in a group. A real time collaboration capability for the instruments is lacking.

There is currently also no device which is able to function as a hub for a plurality of digital musical instruments that facilitates playing music as a band/group, or jam in a group.

SUMMARY OF THE INVENTION

In accordance with a first preferred aspect there is provided a method for enabling the sharing of a computer system resources by multiple input devices connected (wired or wirelessly) to the computer system where device latency is diminished. The multiple input devices all utilize the same device driver. The device driver allocates a device identifier to each of the multiple input devices. The device driver receives data from each of the multiple input devices by reference to the device identifier. The device driver passes the received digital audio data to an application for processing. Preferably, the application may have multi-channel input and output. The wired connections may be connected through sockets such as P/S 2, USB, IEEE 1394, RCA, and SCART while the wireless connection may be using protocols such as UWB, USB wireless, Bluetooth, infrared, and radio frequency.

The multiple input devices may be substantially identical and may be devices such as "Prodikeys" from Creative Technology Ltd, an alphanumeric keyboard or a musical instrument with electronic output. It is preferable that the device driver is either an emulator or a pointer to appropriate drivers. The device identifier may preferably be either a port address or a port identity.

Preferably, the computer system may be selected from the group comprising: a desktop computer, a personal computer, a portable notebook, a laptop computer, a PDA, a standalone console and a peripheral attachable to the aforementioned devices.

The method may further comprise displaying on a screen a graphic user interface for controlling functions of the multiple input devices. The graphic user interface may be able to be operated by each of the multiple input devices or by a computer input device such as a mouse or alphanumeric keyboard. The graphic user interface may comprise a plurality of function buttons for controlling a first aspect of each of the multiple input devices. The first aspect may be a chord structure.

The graphic user interface may further comprise a plurality of boxes, there being one box for each of the multiple input devices. Each of plurality of boxes may be for controlling at least one performance characteristic of the input device. The at least one performance characteristic may be one or more of: volume, pitch shift, octave, and instrument, or instrument audio characteristics for audio reproduction.

The graphic user interface may also comprise a master control box for controlling one or more of: volume, pitch shift, octave, instrument audio characteristics for audio reproduction or other control boxes.

According to a second preferred aspect there is provided a computer usable medium comprising a computer program code that is configured to cause a processor to execute one or more functions to perform the above method.

According to a third preferred aspect there is provided a graphic user interface for controlling functions of multiple input devices, each of the multiple input devices being connectable to a computer system each of the multiple input devices using the one device driver; the graphic user interface being able to be operated by each of the multiple input devices.

The graphic user interface may comprise a plurality of function buttons for controlling a first aspect of each of the multiple input devices. The first aspect may be a chord structure.

The graphic user interface may be comprise a plurality of boxes, there being one box for each of the multiple input devices. Each of plurality of boxes may be for controlling at least one performance characteristic of the input device. The at least one performance characteristic may be one or more of: volume, pitch shift, octave, and instrument audio characteristics for audio reproduction.

The graphic user interface may further comprise a master control box for controlling at least one of: volume, pitch shift, octave, instrument audio characteristics for audio reproduction and other control boxes.

According to a fourth preferred aspect there is provided a computer usable medium comprising a computer program code that is configured to cause a processor to execute one or more functions to generate on a screen the graphic user interface describe above.

According to a fifth preferred aspect there is provided a system for enabling the sharing of a computer system resources by multiple input devices each being connectable to the computer system, the system comprising: a device driver simultaneously and independently utilizable by each of the multiple input devices; the device driver including an identifier allocator for allocating an identifier to each of the multiple input devices; and an output application for outputting processed data received by the device driver from the multiple input devices.

The system may further comprise a graphic user interface for controlling functions of the multiple input devices, the graphic user interface being able to be operated by each of the multiple input devices. The graphic user interface may be as described above.

According to a sixth preferred aspect there is provided an apparatus for enabling the sharing of system resources by multiple input devices connectable to the apparatus, the apparatus comprising: a device driver simultaneously and independently utilizable by each of the multiple input devices; the device driver including an identifier allocator for allocating an identifier to each of the multiple input devices; and an output application for outputting processed data received by the device driver from the multiple input devices. The apparatus may be connectable to devices like a desktop computer, a personal computer, a portable notebook, a laptop computer, a mobile phone or a PDA.

The apparatus may preferably include at least one speaker driver and at least one screen. The apparatus may also be powered by either a DC or an AC power supply.

For all aspects, the multiple input devices may be substantially identical, and may be a musical instrument. In such a case, the data received by the device driver may be digital audio.

Preferred aspects of the method, system and apparatus may be used when teaching music to a group or when playing music in a group.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings.

In the drawings.

DETAILED DESCRIPTION OF THE PREFERRED EMBODIMENTS

Figure 1:
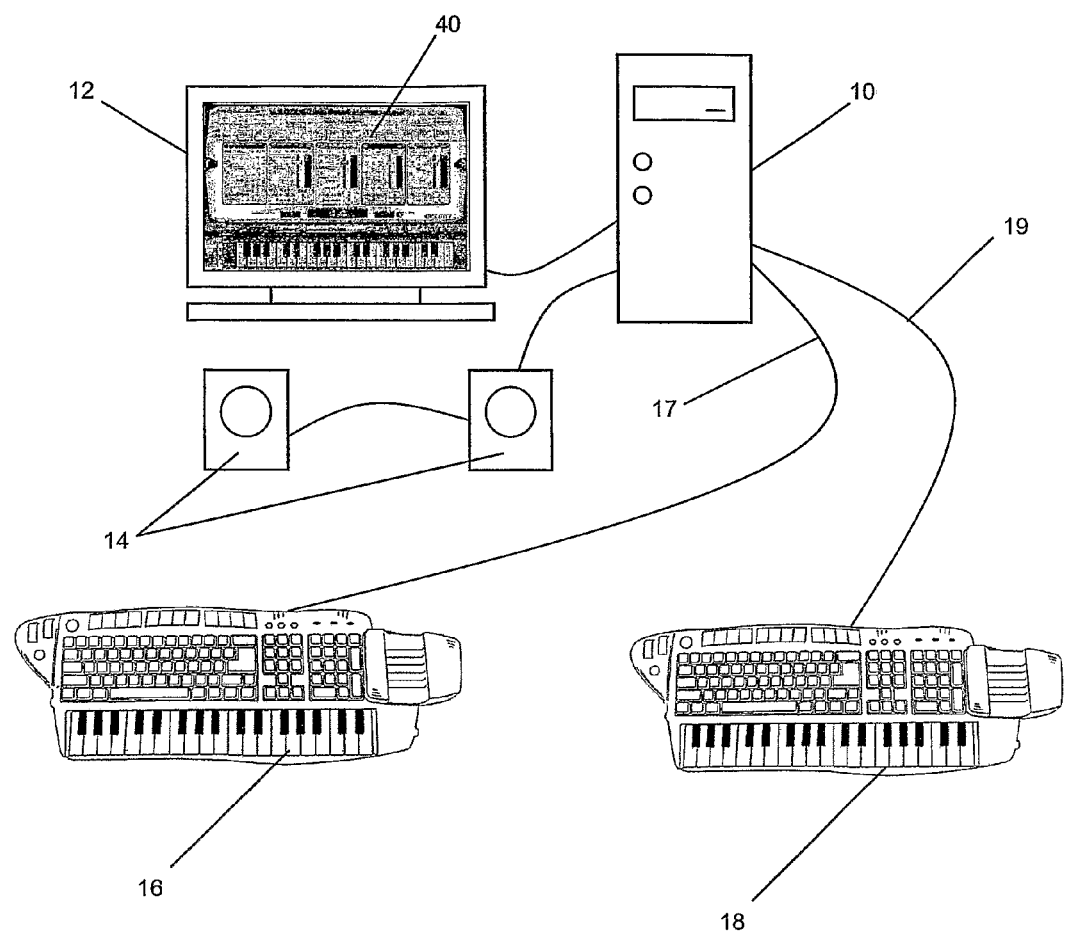
FIG. 1 is a schematic view of a computer installation with multiple input devices.

To refer to FIG. 1 there is shown a desktop computer system having a central processing unit 10, monitor 12, speakers 14 and two input devices 16, 18. As shown, the input devices 16, 18 are both "Prodikeys" keyboards manufactured by Creative Technology Ltd, although any form of input device may be used. The input devices 16, 18 are shown as being identical. Although this is preferred, they may be different. Other input devices that may be used include MIDI keyboards, electric guitars, electric pianos, alphanumeric keyboards and other electronic instruments. However, they should be able to use a universal device driver 24 (FIG. 2) in the CPU 10. The universal device driver 24 may be an emulator or it may act as a pointer to appropriate drivers. A graphical user interface (GUI) 40 for use together with the input devices 16, 18 is shown on the monitor 12. The GUI 40 is solely for illustrative purposes and outlook and features incorporated within GUI 40 may vary. The CPU 10 may be in a desktop computer, a personal computer, a portable notebook, a laptop computer, a PDA, a standalone console or a peripheral attachable to the aforementioned devices.

Figure 2:
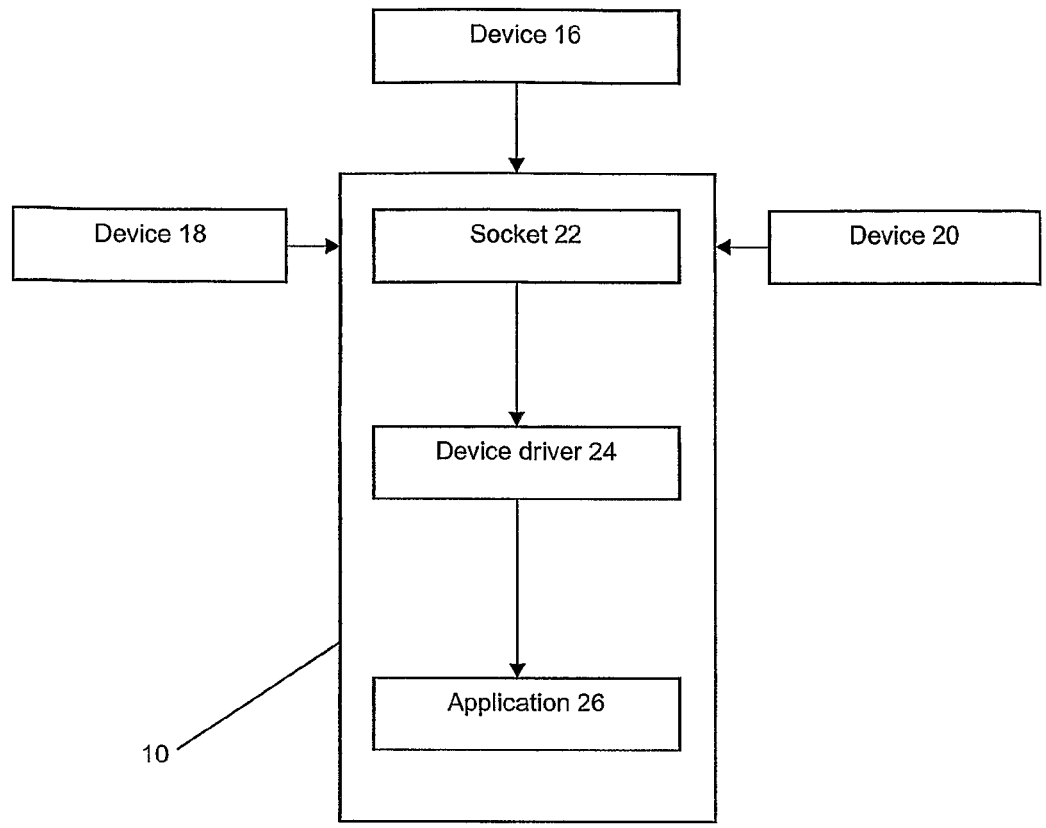
FIG. 2 is an illustration of the system architecture.

As shown in FIGS. 1 and 2, each device 16, 18 is connected to the CPU 10 by use of a cable connection 17, 19 respectively with a USB or IEEE 1394 connector respectively at its end. In that way they connect to the appropriate socket 22 within CPU 10. As shown in FIG. 2, a third device 20 uses the same device driver 24. Alternatively, or additionally, the devices 16, 18 may be wirelessly connected to the CPU 10. The wireless protocols used may include UWB, USB wireless, Bluetooth, infrared, and radio frequency.

FIG. 2 may also represent an alternative embodiment. In this embodiment, CPU 10 may be a standalone device similar to a video games console. The CPU 10 may have at least one processor to process signals from devices 16, 18 and 20. The CPU 10 may also have a memory component, which may be non-volatile in nature. The memory component may be at least one hard disk, or flash memory. The memory component aids in solving the problem of playback latency for devices 16, 18 and 20. The CPU 10 may also have a sound card incorporated within to allow processing of audio signals from the input devices 16, 18, 20 for the playback of sound. The sound card may also include a MIDI synthesizer.

There may also be a plurality of sockets 22. Each socket 22 may be the same or may be of a different type, such as, for example, P/S 2, USB, IEEE 1394, RCA, SCART, and the like. The different types of sockets available allow for a range of different devices to be connectable to the CPU 10. A dongle to facilitate the wireless connection of devices 16, 18 and 20 may also be connected to the CPU 10. The wireless protocols used may include UWB, USB wireless, Bluetooth, infrared, and radio frequency. It is possible that developments in wireless protocols may enable devices 16, 18 and 20 to be portable to a range beyond state/national boundaries and yet still remain connected to the CPU 10. In such an embodiment, devices 16, 18 and 20 may have at least one sound output such as, for example, a speaker or a set of earphones receiving signals from the CPU 10 so that a user of one of the devices may be able to collaborate musically Damming) in real time with other users of devices.

The CPU 10 may have a screen incorporated with (it as is the case of a notebook computer) to display a GUI 40. The screen may be an LCD, TFT or OLED panel. Alternatively, the CPU 10 may also be connectable to an external display unit or to another computer system such as, for example, a desktop computer, personal computer, portable notebook, laptop, a mobile phone and a PDA.

The CPU 10 may also include at least one speaker driver for the output of audio signals generated by the devices 16, 18, and 20. A woofer may also be included in the CPU. Alternatively, the CPU 10 may be connectable to a set of at least one speaker for the transmission of sounds from the devices 16, 18, and 20.

In such an embodiment, a group of users may conveniently jam with each other at nearly any location, as the CPU 10 may be powered by DC power (portable batteries or lighter socket of the car) or from an AC mains supply (including drawing power from a computer connected to it).

Figure 3:
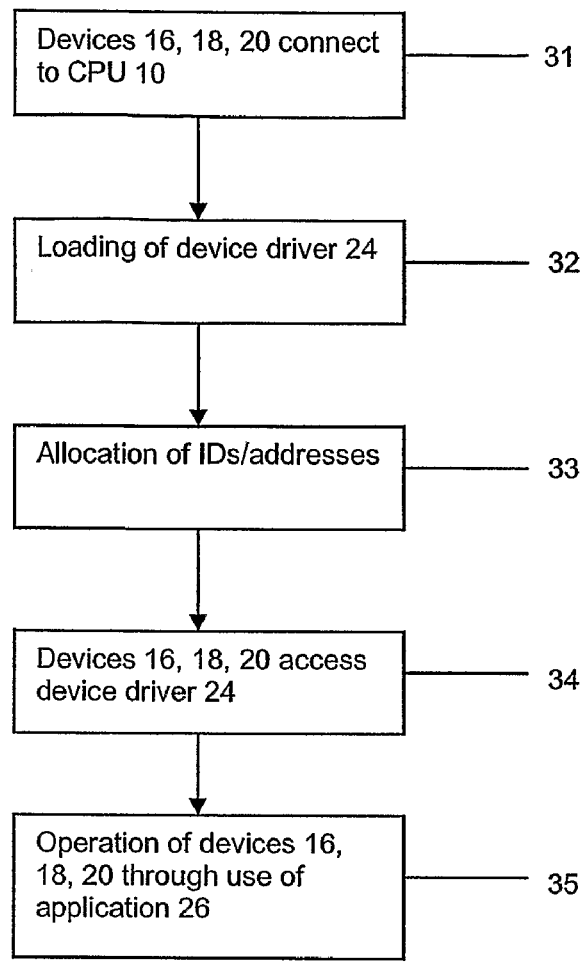
FIG. 3 is a flow chart for the operation of the system.

To refer to FIGS. 2 and 3, when all three devices 16, 18, 20 are connected to CPU 10 (31), the universal device driver 24 is loaded (32) to be used for each device 16, 18, 20. The device driver 24 establishes and allocates an identifier ("ID") for each device 16, 18, 20 (33). As each, device 16, 18, 20 is connected to a different port, this may be by reference to the port identity/address. The device driver 34 then allows all devices 16, 18, 20 to access (34) the device driver 24 and subsequently be operable with the use of the necessary application 26 in the usual manner (35).

Each device 16, 18, 20 may then operate simultaneously yet independently of each other when the universal device driver 24 is being utilized. For example: if all devices 16, 18, 20 are "Prodikeys":

(a) one device 16 could be operating to produce the sound of an electric piano and thus the data sent by device 16 to device driver 24 would be digital audio to replicate the sound of an electric piano;

(b) one device 18 could be operating to produce the sound of an electric guitar and thus the data sent by device 18 to device driver 24 would be digital audio to replicate the sound of an electric guitar; and (c) one device 20 could be operating to produce the sound of a trumpet and thus the data sent by device 20 to device driver 24 would be digital audio to replicate the sound a trumpet.

The device driver 24 processes all the received data and passes it to the application 26, in this case a sound card within CPU 10, for processing by the application 26, and then reproduction by speakers 14. The application 26 may allocate RAM and cache memory for each device 16, 18, 20 and the utilisation of cache memory may allow sound to be transmitted nearly instantaneously from each device 16, 18, 20. The application 26 may have a multi channel input for digital signals from each device 16, 18, 20. The application 26 may also have a multi channel output for the transmission of processed signals. Such a setup may to prevent latency from affecting the real time transmission and harmonisation of sounds from devices 16, 18, 20.

In this way the devices 16, 18, 20 can be used to create a band (in the case of devices being musical instruments and/or "Prodikeys") using one computer, one device driver 24, and one application 26. The band may also be created using the standalone version of the CPU 10.

Figure 4:
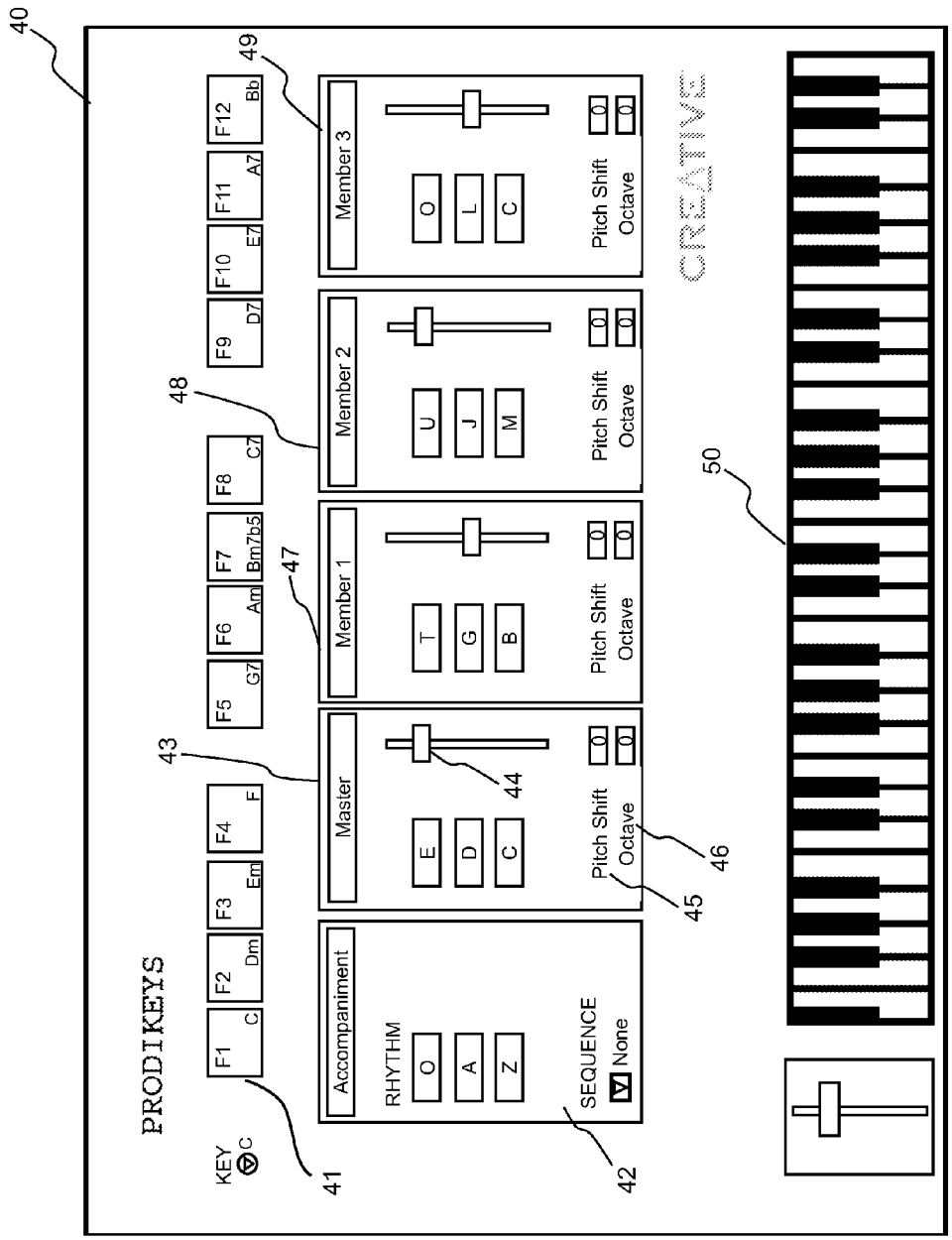
FIG. 4 is an illustration of a GUI for control of the multiple input devices.

FIG. 4 shows the graphic user interface 40 ("GUI") used for controlling the input devices 16, 18, 20. In this case it is for controlling "Prodikeys". The functions of the GUI 40 in FIG. 4 is merely illustrative as it should be noted that the main purpose of the GUI 40 is to allow access to core (not all) capabilities of each input device within the confines of the limited screen space permitted by a display screen (the higher the number of users, the smaller the screen space allocated for each user). As such, the GUI 40 may have more or fewer features than as shown in FIG. 4 depending on the number of input devices connected.

The GUI 40 is for display on the monitor 12 and is operable in conjunction with the device driver 24 and a graphics application on CPU 10. Users of any one of the devices 16, 18, 20 may be able to operate the GUI 40 and thus be able to control certain aspects of the operation of their own devices 16, 18, 20.

A master device may be manually designated by selecting a device using the GUI 40 or automatically designated once the device is connected/plugged at a predetermined port identity/address. A user of the master device may be able to control certain or all aspects of the master device as well as certain or all aspects of the other non-master devices using the GUI 40. In an instance whereby the master device is unable to control a cursor, a cursor control device connected to the CPU 10 like a computer mouse may be used to access functions on the GUI 40.

The GUI 40 may have a number of function keys 41 for providing a basic chord structure to the audio. The chord structures may be pre-set, or set by reference to a menu of available chords. It also has a box 42 for controlling an automatically generated rhythm/accompaniment in accordance with known techniques. A second box 43 is used for the master device. The nature of the audio produced may be selected from three pre-programmed buttons shown as E, D and C. The three buttons can each be programmed to enable the reproduction of audio that resembles one of a set list of instruments including, but not limited to, trumpet, trombone, tuba, clarinet, flute, oboe, bassoon, saxophone (soprano, alto, tenor, baritone), violin, viola, cello, double bass, guitar, electric guitar, bass guitar, glockenspiel, xylophone, vibraphone, celesta, harp, piano, organ, electronic organ, harpsichord, and so forth. A volume slider 44, pitch shift control 45, and octave setting control 46 are also provided.

A similar box 47, 48, 49 is provided for all other members of the "band". As the GUI 40 is on monitor 12, and as all devices 16, 18, 20 are connected to CPU 10, each of the devices 16, 18, 20 can be used for controlling the various functions of the GUI 40. Each member may be able to control their devices simultaneously and independently. The user of the designated master device may be able to control all devices including the master device and all functions of the GUI 40.

In another practical application of the present invention, the GUI 40 may be projected onto a screen and a musical keypad 50 of the GUI 40 may have the relevant keys illuminated in an environment where multiple users of Prodikeys connected to a single processing unit are able to learn to play songs on Prodikeys in a group learning environment.

Whilst there has been described in the foregoing description preferred embodiments of the present invention, it will be understood by those skilled in the technology concerned that many variations or modifications in details of design or construction may be made without departing from the present invention.

What is claimed is:

1. A method for enabling the sharing of a computer system resource, the method comprising:
   (a) connecting a computer system to multiple input devices, the multiple input devices consisting of at least one musical instrument and having real time collaboration capability enabling interactivity for either teaching or playing music in a group;
   (b) utilizing a single device driver for all of the multiple input devices, the multiple input devices collaborate with each other in a group producing music;
   (c) the device driver allocating a device identifier to each of the multiple input devices;
   (d) the device driver receiving audio data from each of the multiple input devices by reference to the device identifier;
   (e) the device driver passing the received audio data to an application for processing, the application allocates memory for each of the multiple input devices; and
   (f) displaying on a screen a graphic user interface for controlling functions of each of the multiple input devices, the graphic user interface being able to be operated by either at least one of the multiple input devices or a computer mouse,
   wherein latency from the multiple input devices is diminished because of memory allocation by the application for each of the multiple input devices.

2. The method as claimed in claim 1, wherein the multiple input devices are each substantially identical.

3. The method as claimed in claim 2, wherein each of the multiple input devices is selected from a group consisting of: Prodikeys, an alphanumeric keyboard and a musical instrument.

4. The method as claimed in claim 3, wherein the data received by the device driver is digital audio.

5. The method as claimed in claim 1, wherein the graphic user interface comprises a plurality of function buttons for controlling a first aspect of multiple input devices.

6. The method as claimed in claim 5, wherein the first aspect is a chord structure.

7. The method as claimed in claim 1, wherein the graphic user interface comprises a plurality of boxes, there being one box for each of the multiple input devices; each of plurality of boxes being for controlling at least one performance characteristic of the input device.

8. The method as claimed in claim 7, wherein the at least one performance characteristic is selected from the group consisting of: volume, pitch shift, octave, and instrument audio characteristics for audio reproduction.

9. The method as claimed in claim 1, wherein the graphic user interface comprises a master control box for controlling at least one selected from the group consisting of: volume, pitch shift, octave, instrument audio characteristics for audio reproduction and other control boxes.

10. The method as claimed in claim 1, wherein the application has at least one feature selected from the group consisting of: multi-channel input and multi-channel output.

11. The method as claimed in claim 1, wherein the computer system is selected from the group consisting of: a desktop computer, a portable notebook, a PDA, a standalone console and a peripheral attachable to the aforementioned devices.

12. The method as claimed in claim 1, wherein the single device driver is selected from the group consisting of: an emulator and a pointer to appropriate drivers.

13. The method as claimed in claim 1, the device identifier is selected from the group consisting of: port address and port identity.

14. A system for enabling the sharing of a computer system resources by multiple input devices connectable to the computer system, the multiple input devices having real time collaboration capability such that interactivity for either teaching music to a group or playing music in a group is capable of being enabled, the system comprising:
   (a) a single device driver simultaneously and independently utilizable by all of the multiple input devices;
   (b) the device driver including an identifier allocator for allocating an identifier to each of the multiple input devices;
   (c) an output application for outputting processed audio data received by the device driver from the multiple input devices, the output application allocates memory for each of the multiple input devices; and
   (d) a graphic user interface for controlling functions of the multiple input devices, the graphic user interface being able to be operated by each of the multiple input devices;
   wherein latency from the multiple input devices is diminished because of memory allocation by the output application for each of the multiple input devices.

15. The system as claimed in claim 14,
   wherein the data received by the device driver is digital audio;
   wherein the multiple input devices are each substantially identical; and
   wherein each of the multiple input devices is selected from a group consisting of: Prodikeys, an alphanumeric keyboard and a musical instrument.

16. The system as claimed in claim 14, wherein the graphic user interface comprises a plurality of function buttons for controlling a first aspect of each of the multiple input devices.

17. The system as claimed in claim 16, wherein the first aspect is a chord structure.

18. The system as claimed in claim 14, wherein the graphic user interface comprises a plurality of boxes, there being one box for each of the multiple input devices; each of plurality of boxes being for controlling at least one performance characteristic of the input device.

19. The system as claimed in claim 18, wherein the at least one performance characteristic is selected from the group consisting of: volume, pitch shift, octave, and instrument audio characteristics for audio reproduction.

20. The system as claimed in claim 14, wherein the graphic user interface comprises a master control box for controlling at least one selected from the group consisting of: volume, pitch shift, octave, instrument audio characteristics for audio reproduction and other control boxes.

21. The system as claimed in claim 14, wherein the device driver is selected from the group consisting of: an emulator and a pointer to appropriate drivers.

22. The system as claimed in claim 14, wherein the identifier is selected from the group consisting of: port address and port identity.

* * * * *